United States Patent [19]

Christian

[11] Patent Number: 4,530,432

[45] Date of Patent: Jul. 23, 1985

[54] SCREW CONVEYER

[75] Inventor: Robert F. Christian, San Francisco, Calif.

[73] Assignee: Jude Engineering, Inc., San Francisco, Calif.

[21] Appl. No.: 531,701

[22] Filed: Sep. 13, 1983

[51] Int. Cl.³ .............................................. B65G 33/26
[52] U.S. Cl. .................................... 198/662; 198/676; 366/81; 366/319
[58] Field of Search ............... 198/661, 676, 662, 677; 110/110; 432/139; 366/81, 319, 323

[56] References Cited

U.S. PATENT DOCUMENTS

| | | | |
|---|---|---|---|
| 915,702 | 3/1909 | Schroer | 198/676 |
| 1,684,254 | 9/1928 | Bailey | 198/676 |
| 2,617,273 | 11/1952 | Findlay | 198/676 |
| 2,733,898 | 2/1956 | Christian | 198/676 |
| 4,405,239 | 9/1983 | Chung et al. | 198/661 |
| 4,430,057 | 2/1984 | Hoover et al. | 432/139 |

Primary Examiner—Joseph E. Valenza
Attorney, Agent, or Firm—Murray, Whisenhunt and Ferguson

[57] ABSTRACT

The invention provides a screw conveyer which has a helically wound member (23) attached to the screw which member extends from each turn of the screw towards the next turn and is of decreasing diameter along the screw.

4 Claims, 2 Drawing Figures

SCREW CONVEYER

BACKGROUND TO THE INVENTION

This invention relates to helical conveyors of the kind having a helical flite fixed to a rotary shaft within a casing. Such conveyors are used with success with a great variety of pulverous and semi-fluid products.

Considerable difficulty however has been experienced in dealing with products which tend to solidify and jam between the screw and housing. For example, combustible waste products are heated to a very high temperature e.g. 1650° F. for removal of moisture and are fed through a conveyor into a furnace. These products are very fluid at that temperature and run freely through a downpipe into the entry end of the conveyor where they rapidly become cooled e.g. to 300° F. at which temperature the products tend to solidify and pack together and stop the helical conveyor. Attempts have been made to overcome this problem by using a larger horsepower motor to drive the conveyor and for example from a nominal 3 horsepower successive tests finally reached 25 horsepower which is obviously impractical.

OBJECT OF THE INVENTION

The object of the invention is to devise a helical conveyor which will enable such products to be conveyed without undue increase in horsepower.

Various ideas were considered but the present invention proved successful on test.

DESCRIPTION OF PREFERRED EMBODIMENT

Figure 1:
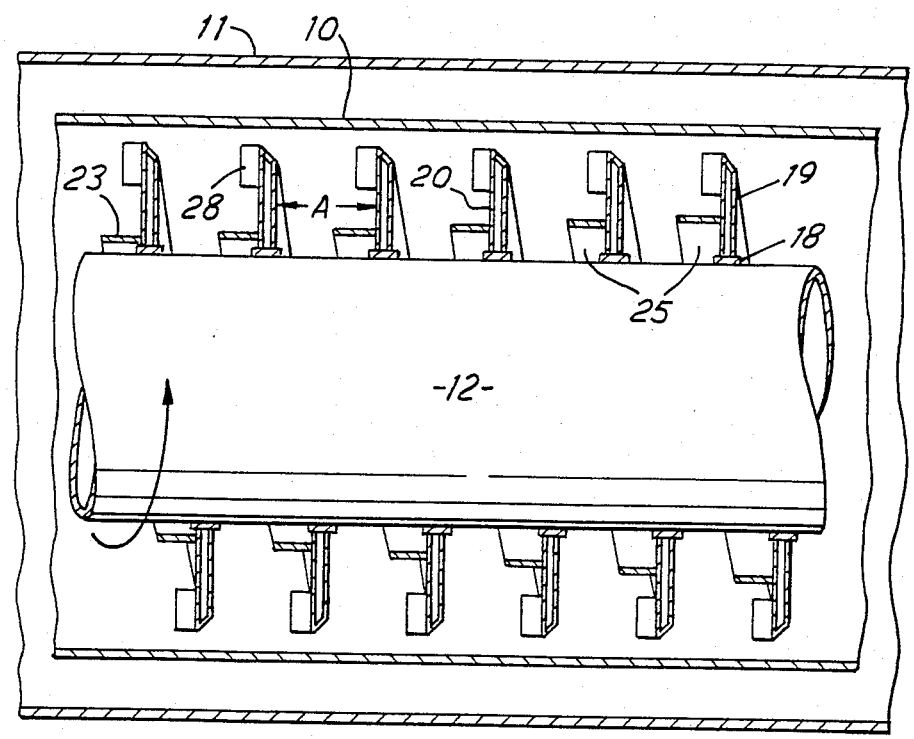
Figure 2:
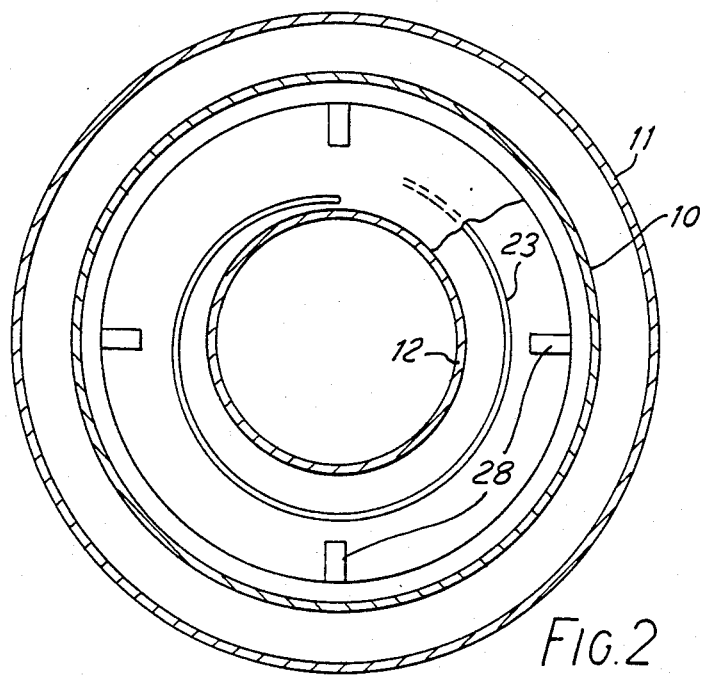

The invention will be described by way of example with reference to the accompanying diagrammatic drawings wherein:

FIG. 1 is a part vertical section of a helical screw conveyer made in accordance with the invention; and FIG. 2 is an end view thereof.

The conveyer has a conveyer casing 10 which in this example is tubular and is within an outer tube 11 with a space between the casing and tube for flow of heating or cooling medium.

A central hollow shaft 12 extends through the casing and heating or cooling medium can flow through the shaft.

The bearings for mounting the shaft are of well known construction and need not be shown or described. Similarly means for inlet and outlet of product to be treated and means for inlet and outlet of heating or cooling medium are too well known to need description or illustration.

Surrounding the shaft in contact therewith is a flat ribbon helical pad 18 which is welded to the shaft at its ends. A helical lead flite 19 surrounds the shaft and seats on the pad 18 and is welded to it only at its ends. A helical back plate 20 is then welded at its outer edge to the lead flite 19 and at its inner edge to the pad 18 thereby making a hollow flite through which heating or cooling medium can flow. Then a helical flat ribbon type barrier member 23 is welded to the back plate so as to project from each helix of the back plate towards the next adjacent lead flite a distance of 30 to 50 percent of the total distance "A" between the back plate and lead flite. The member 23 is of decreasing diameter towards the outlet end of the conveyer (left hand end in FIG. 1) thereby providing blocking space 25 of decreasing size. This has the effect of receiving a mass of the product which barely moves if at all and the remaining space 26 is of increasing size so enabling the product to move forward.

In addition barrier plates 28 are fixed to the back plate and extend more or less radially from the outer edge of the helical conveyor flite towards the barrier member 23 i.e. they project from the flite in the same direction as the barrier member 23. These plates form a further hindrance and prevent packing and jamming of the product.

I claim:

1. A screw conveyer comprising a casing, a shaft mounted for rotation in the casing, a helical conveyer flite of constant external diameter mounted on and fixed to said shaft, and a helically wound member attached to said flite, said member being a separately formed flat ribbon attached at one edge to said flite of continuously decreasing diameter throughout its length in one axial direction so that the distance between the successive helices of said member from said shaft decreases, said member at each position extending from each helix of the conveyer flite axially partway towards the next helix of the conveyer flite and being spaced from the shaft and from the outer rim of said flite.

2. A screw conveyer as claimed in claim 1 wherein the shaft is hollow and the casing is tubular and is surrounded by an outer tube with a space between the casing and tube, said conveyer flite also being hollow, and said member at each position of attachment to the conveyer flite extends towards the adjacent helix of the conveyer flite a distance of 30 to 50 percent of the distance between adjacent helices of said conveyer flite.

3. A screw conveyer comprising a casing, a shaft mounted for rotation in the casing, a helical conveyer flite mounted on said shaft, and a helically wound member attached to said flite, said member being of decreasing diameter in one axial direction so that the distance between the successive helices of said member from said shaft decreases, said member extending from each helix of the conveyer flite partway towards the next helix of the conveyer flite, and blades are attached to the conveyer flite radially outwards of said member and projecting from the conveyor flite in the same direction as said member.

4. A screw conveyer comprising a casing, a shaft mounted for rotation in the casing, a helical conveyer flite mounted on said shaft, and a helically wound member attached to said flite, said member being of decreasing diameter in one axial direction so that the distance between the successive helices of said member from said shaft decreases, said member extending from each helix of the conveyer flite partway towards the next helix of the conveyer flite, and blades are attached to the conveyor flite radially outwards of said member and projecting from the conveyer flite in the same direction as said member, said member being a flat ribbon which at each position of attachment to the conveyer flite extends towards the adjacent helix of the conveyer flite a distance of 30 to 50 percent of the distance between adjacent helices of said conveyer flite.

* * * * *